United States Patent [19]
Bronicki

[11] Patent Number: 5,437,157
[45] Date of Patent: Aug. 1, 1995

[54] METHOD OF AND APPARATUS FOR COOLING HOT FLUIDS

[75] Inventor: Lucien Bronicki, Yavne, Israel

[73] Assignee: Ormat Industries Ltd., Yavne, Israel

[21] Appl. No.: 17,302

[22] Filed: Feb. 12, 1993

Related U.S. Application Data

[63] Continuation-in-part of Ser. No. 955,686, Oct. 2, 1992, abandoned, and a continuation-in-part of Ser. No. 955,454, Oct. 2, 1992, abandoned, and a continuation-in-part of Ser. No. 989,918, Dec. 11, 1992, abandoned, which is a continuation of Ser. No. 730,526, Jul. 15, 1991, abandoned, which is a continuation of Ser. No. 444,565, Jul. 1, 1989, abandoned, and a continuation of Ser. No. 952,156, Sep. 28, 1992, which is a continuation of Ser. No. 658,303, Feb. 20, 1991, abandoned.

[51] Int. Cl.⁶ ............................................. F01K 23/04
[52] U.S. Cl. ................................ 60/655; 60/686; 60/912; 165/85
[58] Field of Search ............... 60/685, 686, 690, 912, 60/655; 165/85

[56] References Cited

U.S. PATENT DOCUMENTS

2,649,082  8/1953  Harbert et al. ................ 165/85 X

FOREIGN PATENT DOCUMENTS

2082317  3/1982  United Kingdom ............... 165/85

OTHER PUBLICATIONS

H. Knirsch, "Design and Construction of Large Direct Dry Cooled Units for Thermal Power Plants", 90-JPGC/Pwr-26, presented at ASME/IEEE Power Generation Conference, Boston, Mass., Oct. 21–25, 1990.
G. R. Mirsky, "Designing Cooling Towers to Accommodate the Environment", *Power*, May 1992.
B. Trage et al., "The Natural Draught, Indirect Dry Cooling System for the 6×686 MWe Kendal Power Station, RSA", presented at ASME/IEEE Power Generation Conference, Boston, Mass., Oct. 21–25, 1990.
E. C. Guyer et al., "Dry Cooling Moves into the Mainstream", *Power Engineering*, Aug. 1991.
T. C. Elliott et al., "Air Cooled Condensers", *Power*, Jan. 1990.

*Primary Examiner*—Stephen F. Husar
*Attorney, Agent, or Firm*—Sandler, Greenblum & Bernstein

[57] ABSTRACT

The cooling of a hot fluid is effected using a heat exchanger adapted to receive the hot fluid and liquid coolant for cooling the hot fluid such that the liquid coolant is vaporized. A turbine, having an output shaft connected to a fan, is responsive to vaporized coolant which expands in the turbine for driving the fan to move a mass of air, and produce vaporized coolant. A condenser receives the expanded vaporized coolant and is responsive to air blown by the fan, for condensing the expanded vaporized coolant thereby cooling the same and producing coolant condensate which is then returned to the heat exchanger.

15 Claims, 1 Drawing Sheet

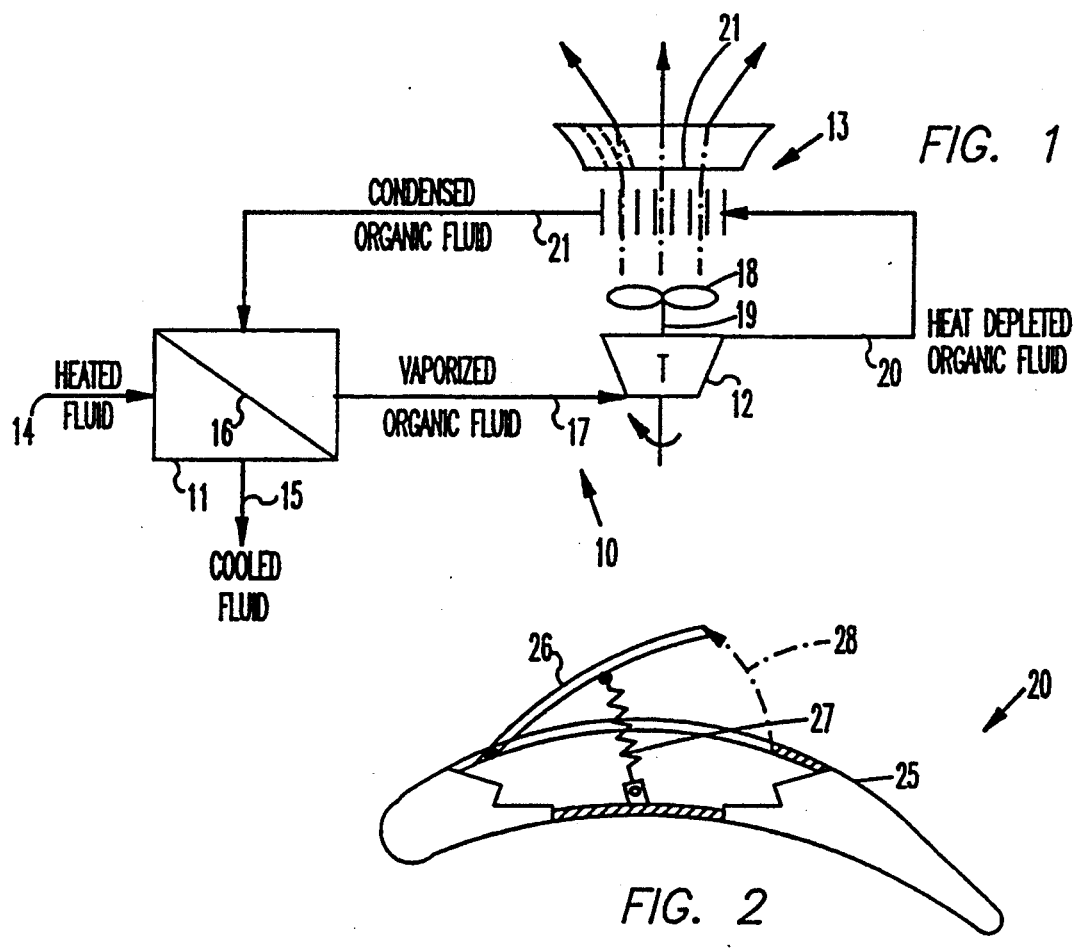
FIG. 1
FIG. 2
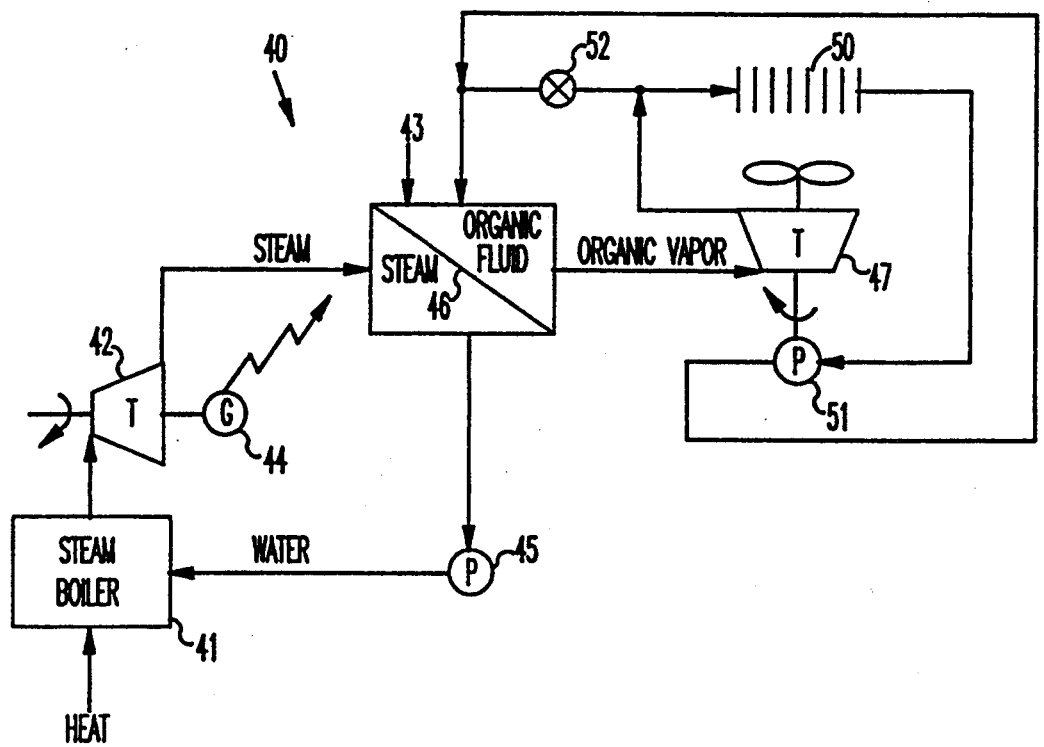
FIG. 3

METHOD OF AND APPARATUS FOR COOLING HOT FLUIDS

RELATED APPLICATIONS

This application is a continuation-in-part of the following applications, the disclosure of each of which is hereby incorporated by reference: Ser. No. 955,686 filed Oct. 2, 1992 (now abandoned); Ser. No. 955,454 filed Oct. 2, 1992 (now abandoned); Ser. No. 989,918 filed Dec. 11, 1992 (now abandoned) which is a continuation of Ser. No. 730,526 filed Jul. 15, 1991 (now abandoned), which is a continuation of Ser. No. 444,565 filed Jul. 1, 1989 (now abandoned); and Ser. No. 952,156, filed Sep. 28, 1992, which is a continuation of Ser. No. 658,303, filed Feb. 20, 1991 (now abandoned).

TECHNICAL FIELD

This invention relates to a method of and apparatus for cooling hot fluids.

BACKGROUND OF THE INVENTION

Many industrial processes involve low grade cooling of fluids by rejecting heat from a hot fluid into a sink under conditions where the temperature difference is too small to justify using waste heat converters for producing electricity. Steam condensers for steam turbine power plants, industrial processes involving distillation operations and producing chemicals, are examples in which low grade heat is rejected into ambient air or water. The temperature difference between the fluid to be cooled and the temperature of the heat sink is often so small that recovering heat in the fluid is too costly in terms of the size and expense of a suitable heat exchanger.

In industrial processes of the type described above, air cooling is often utilized sometimes due to a lack of available water, such as sea, lake, or river water, but often to minimize the environmental impact of water cooling. For example, cooling towers are conventionally used in conjunction with water cooled power plant condensers in order to conserve water, and these towers input water from the system into the atmosphere in the form a vapor plume that contributes to air pollution. Furthermore, such installations are noisy and can cause visibility problems particularly the cooling towers are located in the vicinity of roads or highways. Cooling towers further require periodic blow-down to extract undesirable chemicals from the cooling system and, often, the cooling water requires treatment, for example the addition of certain chemicals to the water. Disposal of these chemicals is often an environmental problem.

Frequently, cooling ponds are required which also have their impact on the environment. In addition, cooling towers require large quantities of relatively quality water.

Having selected air cooling, the designer is faced with both cost and operational problems. The cost problems are best appreciated from considering how relatively small temperature differences affect heat transfer. In engineering terms, small temperature differences translates into a requirement for a large heat transfer surface areas. Traditionally, for process cooling, this has resulted in using large numbers of finned tubes through which the hot fluid flows; and this is costly in terms of material and fabrication. Operational problems are concerned with parasitic losses due to the energy required to force large masses of air through the finned tubes, and the energy required to pump the fluid to be cooled at a relatively high velocity through long length, small diameter, finned tubes in order to effect heat transfer. For steam condensation in power plant operations, for example, parasitic losses also arise from the necessity for maintaining a large vacuum in the air-cooled condenser which implies the circulation of relatively large volumes of steam in the condenser. To reduce these parasitic losses, the diameter of the finned tubes can be increased and their length shortened, but this approach increases construction costs and reduces heat transfer efficiency. Furthermore, fans are required which consume electrical power that must be supplied form an external source.

Due to the relatively large heat exchange area and piping needed when air cooling is utilized, indirect air cooling has been used where an additional cooling cycle is introduced. The fluid flowing in the additional cooling cycle cools the hot fluid. Heat is extracted from the additional cooling fluid by passing the fluid through heat exchangers positioned in a conventional natural draft dry cooling tower. By using water as the cooling fluid in the additional cooling cycle, a direct contact condenser has been used in steam operated power plants. Experience reported in ASME paper 90 JPGC/PWR-25, however, shows that the anticipated advantages concerning the efficiency, compared with a conventional surface condenser, could not be achieved. In addition, the increased quantity of water brought about by the use of the additional cooling cycle caused problems with the main cycle. As disclosed in the ASME paper, the alternative solution was a surface indirect condenser used for condensing steam exiting the condenser. In both of these approaches, substantial additional equipment had to be used including a dry, natural draft, cooling tower.

There are other problems in industrial, or other processes involving air cooling a hot fluid that is "dirty" i.e., contains foreign material that fouls the interiors of the finned tubes. The large number and the long length of these tubes often present formidable cleaning problems. In air-cooled steam condensers, the large number of tubes and the potential for leakage at their header connections represent a further problem.

It is therefore an object of the present invention to provide a new and approved method of and apparatus for cooling hot fluids which substantially overcomes or significantly reduces the problems outlined above.

BRIEF DESCRIPTION OF THE INVENTION

According to the present invention, hot fluid is cooled by transferring heat in the hot fluid to a liquid coolant for vaporizing the liquid coolant. The vaporized coolant is used to produce work in the form of moving a mass of ambient air. The vaporized coolant, after work has been extracted, is condensed by the transfer of heat therein to the moving mass of ambient air.

Preferably, an indirect heat exchanger is used to produce vaporized coolant using the hot fluid, and a turbine is used for producing work using the vaporized coolant. A fan may be coupled directly to the output shaft of the turbine by attaching fan blades for producing the mass flow of ambient air in response to the operation of the turbine. The heat-depleted vaporized coolant exhausted from the turbine is applied to a condenser cooled by the fan to produce condensed coolant which is then returned to the indirect heat exchanger to complete the cycle.

Preferably, the condenser is located at an elevation above the elevation of the heat exchanger such that gravity is sufficient to return the condensed coolant to the heat exchanger to complete the cycle without the need of a pump. In addition, if a cycle pump is used for cycling the coolant, the pump can operated by the turbine by directly coupling the input shaft of the pump to the turbine output shaft.

When the latent heat of vaporization of the coolant is large, as for example when the coolant is an organic fluid, e.g., pentane the cooling of the hot fluid is more efficiently carried out. When the hot fluid to be cooled is steam, the heat exchanger may operate at a higher pressure than would have prevailed were no such system used, but the pressure is chosen to be optimal for the inclusion of the power anticipated in the additional coolant cycle. This is in distinction to a conventional, water cooled vacuum condenser associated with steam turbines which introduces a large pressure drop with attendant problems in parasitic losses and leakage, and in cost due to the presence of many tubes and manifolds. Moreover, the operating pressure in the coolant side of the heat exchanger is chosen so that relatively small diameter, relatively long tubes can be used without adversely affecting the pressure drop through the tubes. As a result, the tube length is constrained only by transportation limitations imposed on shipping components from the tube manufacturer to the plant site.

The present invention permits relatively simple, and relatively inexpensive tube and shell, or plate, type heat exchangers to be used with the coolant which is preferably a clean, pure fluid such as an organic fluid passing inside the tubes of the heat exchanger and the hot fluid passing outside. Cleaning of the heat exchanger is thus facilitated by this arrangement because fouling will occur on the outside of the tubes rather than on the inside. In addition, the reduction in size and cost of the heat exchanger for the hot fluid, and the reduced pressure drop in the heat exchanger significantly reduces construction and the maintenance costs, and reduces parasitic losses as well. These savings quickly pay for the added costs associated with the coolant condenser.

Another advantage of the present invention lies in its ability to virtually self controlling in the face of varying operating conditions for the hot fluid and varying ambient air conditions. For example, in winter, the ambient air is cooler than in summer causing the turbine driving the fan to produce more work. As a result, the fan tends to run faster in the winter increasing the cooling of hot fluid which corresponds to increased power production form a powder plant (when the coolant is used to cool the condenser of a power plant) and accordingly the heat rejection is increased (particularly in a combined cycle power plant) and is desirable for this reason. In summer, on the other hand, the opposite will be the case thus resulting in a system that is self-controlling. For further self-controlled operation during high speed operation of the fans, inherently, the increased speed of the fan increases the load on the turbine and this acts as a brake for the turbine. An automatic control over the turbine can be effected by providing, for example, centrifugally operated air brakes on the fan blades that would be deployed in response to angular rotation above some threshold in order to reduce to efficiency of the fan in delivering air. Alternatively, or in addition, a bypass of the coolant condenser can be provided in order to exert additional control over the work provided by the turbine. Finally, the present invention has the advantage of being able to continue to provide cooling of a hot fluid in an industrial process plant in the face of a power failure because the motor force for the cooling fan is derived from the heat contained in the fluid to be cooled and is independent of the electrical grid.

Preferably, the condenser is located at an elevation above the elevation of the heat exchanger such that gravity is sufficient to return the condensed coolant to the heat exchanger to complete the cycle without the need for a cycle pump. A further advantage of the present invention in not using water is the circumvention of problems with freezing.

By using another fluid which is usually different from the fluid being cooled, the present invention gains a majority of the working power of the cooing cycle. The integration of the coolant cycle and the working power resulting from permits the fans of the coolant condenser (which is sized accordingly) to be run directly without the necessity for additional auxiliary electricity. This avoids the use of an electric generator to convert the work produced by the coolant turbine to electricity, and the use of an electric motor to operate off the produced electricity to run the fans. Furthermore, the present invention eliminates using large and costly natural draft dry air coolers which are required with air coolers having an additional cooling cycle as explained above.

BRIEF DESCRIPTION OF THE DRAWINGS

Embodiments of the present are described by way of example with reference to the accompanying drawings wherein:

FIG. 1 is a schematic block diagram of the present invention;

FIG. 2 is a section through a fan blade used with the present invention showing an example of fan automatic control, such as a centrifugally operated brake; and FIG. 3 is a block diagram of a steam base power plant wherein condenser cooling is effected in accordance with the present invention.

DETAILED DESCRIPTION

Referring now to the drawings, reference numeral 10 designates apparatus according to the present invention for cooling a hot fluid. The main components of the apparatus comprise heat exchanger 11, turbine 12 and condenser 13. Heat exchanger 11 is an indirect type of heat exchanger in which hot fluid is applied to inlet 14 of the heat exchanger and cooled fluid is removed at outlet 15 of the heat exchanger. The hot fluid may include fluids such as liquids that are part of an industrial or chemical process, as well as gases or vapors such as steam associated with a power plant.

Liquid coolant is present on the other side of heat exchanger 11 and cools the hot fluid by the heat exchange process that occurs across the heat exchange surfaces 16 of the heat exchanger. Preferably, the liquid coolant is an organic fluid whose boiling point is consistent with the temperature of the hot fluid to be cooled.

The heat transferred through surface 16 of heat exchanger 11 vaporizes the liquid coolant producing vaporized coolant which exits the heat exchanger at outlet 17. The vaporized coolant is applied to turbine 12 where expansion of the vaporized coolant occurs driving fan 18 which is directly attached to output shaft 19 of the turbine. Heat-depleted coolant exhausted from the turbine in exhaust line 20 is applied to condenser 13, which includes a plurality of preferably finned tubes 21 connected in parallel and located in operative position with respect to fan 18. The rotation of fan 18, by reason of the operation of turbine 12, moves a mass of ambient air through finned tubes 21 such that the latent heat of condensation contained in the coolant exhausted from the turbine is transferred to the air mass such that condensation of the coolant takes place at outlet 22 of the condenser. Line 23 at the outlet of the condenser returns the coolant to inlet 24 on the coolant side of heat exchanger 11. optimally, the condenser is located at an elevation above the elevation of heat exchanger 11 such that gravity is sufficient to return the condensed coolant to heat exchanger 11 to complete the cycle. Alternatively, a pump can be used for returning the condensed coolant to heat exchanger 11. Such a pump may be powered by the coolant cycle turbine by also coupling the pump to the output shaft of the coolant cycle turbine.

The operation of the present invention is virtually self regulating with regard to variations in the flow rate and heat content of the hot fluid and variations in ambient temperature conditions. Changes in the flow rate or the heat content of the hot fluid to be cooled is reflected directly in the amount of vaporized coolant that is produced by condenser 11 is response to the application of hot fluid to the heat exchanger. As the heat content goes down, e.g., when the flow of hot fluid is reduced, the amount of vaporized cooling decreases and the turbine speed will decrease in response thereby decreasing the heat transferred to the coolant on the cooling side of the heat exchanger. The reverse is true when the heat content or the flow rate of the hot fluid is increase.

Extreme changes in ambient temperature, which occur between summer and winter at many latitudes, is accommodated by an inherent change in the load on the turbine imposed by the fan. For example, in the winter when ambient temperature is usually considerably below summer temperature, the amount of work produced by turbine 12 will increase because the turbine will operate more efficiently, and the rotation of the turbine will tend to increase. The increased rotation of the fan will impose an increasing load on the turbine which will tend to suppress increases in the turbine speed. Such self-control is beneficial and does not require external control. Under extreme conditions, an external control may be provided; and an example of this is shown in FIG. 2 to which reference is now made.

Blade 25 of fan 18 (FIG. 2) is provided with air brake 26 in the form of a hinged flap that is resiliently held in place by spring 27. The spring is designed, and is effective to hold flap 26 in its closed position in which the fan has the maximum efficiency in moving air until the rotational speed of the fan is such that centrifugal forces acting on the mass of the flap cause it to move in the direction indicated by arrow 28. The extent of movement is determined by the rotational speed of the fan.

Flap 26 serves as a spoiler to the airflow around the blade and reduces the efficiency of the fan in moving air. Flap 26 can be controlled by external means in a position determined by spring 27. As a consequence, the amount of air moved by the fan after the rotational speed of the fan passes a threshold will be reduced. Thus, under very cold conditions during the winter when turbine 12 is operating most efficiently and the speed of the fan is increased, the amount of air produced by the fan and blowing through the finned tubes will be reduced by deployment of the air brake in order for the amount of heat removed from the heat depleted coolant to remain substantially constant and independent of the ambient conditions.

Because vaporization of the coolant occurs in heat exchanger 11, the heat exchanger is very efficient in removing heat from the hot fluid. This is particularly true when the hot fluid must be condensed in the heat exchanger and the latent heat of condensation must be removed by the coolant. Exhaust steam from an industrial process or from a turbine is an example of a hot fluid which is condensed in the heat exchanger. Under this condition, heat exchanger 11 may be configured as a shell and tube with the hot fluid to be condensed flowing on the outside of the tubes and the coolant flowing inside the tubes. Where the coolant is organic fluid, the cleaning of the coolant side of the condenser is virtually eliminated since the coolant is a pure fluid. Any cleaning that is necessary usually will be limited to the steam side of the condenser and that includes only the outer surfaces of the tubes. Thus, the heat exchanger is of simple construction and is easily maintained.

By interposing a coolant between the hot fluid to be cooled and ambient air, such that the coolant is vaporized and condensed in separate heat exchanger in accordance with the present invention, the size of heat exchanger 11 is reduced in comparison to the size were the heat exchange process to include transfers from hot fluid to air. The reduction in size of the heat exchanger is accompanied by a decreased pressure drop in the system thereby further reducing costs of fabrication and installation. The cost of the coolant heat exchanger is quickly paid for in savings effected by the reduction in size of the heat exchanger for the hot fluid.

The present invention thus provides for extracting a relatively large amount of heat at a relatively small pressure or temperature difference. This has the effect of reducing parasitic losses in the system. One of the reasons for this reduction in parasitic losses, of course, is the direct operation of the fan by the turbine for cooling the condenser for the heat-depleted coolant rather than having an electric motor drive for the fan.

When the hot fluid is steam, and its source is the exhaust of a steam turbine, the present invention enables the system to operate at a higher pressure ratio across the inlet to the steam turbine and the inlet to the cooling system because the pressure drop in the cooling system according to the present invention is low as compared to a conventional steam condenser where the manifolds and condenser tubes cause a relatively large pressure drop. Furthermore, the use of vacuum in such conventional condensers further increases the pressure drop in such a system. In addition, the cost of conventional air condensers is large due to the presence of many tubes and manifolds.

FIG. 3 of the drawing shows the present invention applied to a power plant. Apparatus 40 shown in FIG. 3 includes boiler 41, turbine 42, and heat exchanger 43. Boiler 41, supplied with heat from an external source, such as geothermal fluid originating from a well, produces steam which is supplied to the inlet of turbine 42 wherein the steam expands and driving generator 44 which produces electricity. Alternatively, steam originating from a geothermal well, separator, or other source of steam may be supplied to the turbine. Steam which is exhausted from the outlet of the turbine is supplied to heat exchanger 43. Heat is extracted from this steam thereby condensing it into water which is returned by pump 45 to boiler 41 to complete the cycle.

Heat exchanger 43 is similar to heat exchanger 11 shown in FIG. 1 in that it is an indirect heat exchanger having a steam side and an organic fluid side. The latent heat of condensation contained in the steam exhausted from the turbine on the steam side of the condenser passes through heat exchange surface shown schematically at 46 into liquid organic fluid on the organic fluid side of the condenser. The result is that the latent heat of condensation released on the steam side supplies the latent heat of vaporization on the organic fluid side producing organic vapor which is supplied to turbine 47 having an output shaft 48 attached to fan 49 having a plurality of blades. The organic vapor expands in turbine 47 driving the output shaft and consequently the fan and heat-depleted organic fluid vapor is exhausted from the turbine which is supplied to coolant condenser 50 operatively associated with fan 49. The moving air mass produced by fan 49 causes condensation of the heat-depleted organic fluid vapor exhausted from turbine 47, and the condensed liquid is either returned by gravity to the organic fluid side of heat exchanger 43 or is applied to optional pump 51 for the purpose of returning the condensed, organic fluid to the heat exchanger.

To provide additional control over the operation of the apparatus shown in FIG. 3, bypass 52 may be utilized for directly returning some of the heat depleted vaporized organic fluid to condenser 43. This bypass could be used in winter when fan 49 driven by turbine 47 normally would be more effective in cooling the heat-depleted organic vapor.

Alternatively, or in addition, fan 49 can be provided with centrifugally controlled brakes such as shown in FIG. 2. As indicated above, this would reduce the cooling effect of the fan by reducing the mass flow of air produced by the fan.

When the hot fluid is steam, as shown for example in FIG. 3, the vaporizer heat exchanger is preferably positioned in the vicinity of the steam turbine in order to reduce the length of piping used from the steam turbine exhaust to the vaporizer heat exchanger. This also minimizes investment costs and parasitic losses because it allows relatively higher pressures to be used in the piping between the turbine exhaust and the vaporizer heat exchanger indicated by reference numeral 43 in FIG. 5.

To optimize the system of the present invention when the hot fluid to be cooled contains waste or process heat, a coolant is selected in accordance with the temperature of the hot fluid and the temperature of the air in order to optimize the size of the installation. For example, a fluid with a low boiling point (i.e., higher vapor pressure) can be used in order to reduce the diameter of the tubing. When, however, the hot fluid to be cooled is steam from a power plant, and is to be condensed, the optimum coolant is selected according to its heat transfer characteristics, while the condenser vacuum is chosen according to the size and required power requirements of the cooling system.

The higher the pressure in the air cooler, the smaller can be the diameter of the tube that can be used. Thus, the system can be optimized by choosing a fluid with a suitable vapor pressure in selecting other appropriate components to reduce the cost of the system. For example, if tubes no longer than ten meters can be transported, thus establishing the maximum tube length, the choice of fluid will influence the diameter of the tubes. If, on the other hand, tubes of twenty meters can be transported, then another fluid may be required.

The turbine in this system is of secondary importance as far as its efficiency is concerned because of the large amount of heat that is available. Thus, the basis for choosing a fluid is not to optimize turbine efficiency. Rather, what is important in choosing a coolant is to be able to effectively use the temperature difference between the vaporizer heat exchanger and the condenser heat exchanger, or, in fact, to reduce the cost for a given temperature difference. Hence, if the temperature difference decreases, the area of the coolant fluid condenser heat exchanger would not necessarily be increased in accordance with the present invention because a different coolant could be used.

For a certain temperature difference, it may be desirable to select the coolant in order to reduce the cost of the whole installation including the air coolers (i.e., the coolant condenser), the intermediate exchanger, and all of the piping and tubing used as well as the turbine. The turbine brings about a reduction of cost because it replaces and eliminates the need for an electric motor to drive the fan, for switches to control the electric motor, cabling for the motor, and switch gear connected to the cables, etc., thus effecting considerable saving in the electrical installation. In addition, the present invention operates substantially without the need for electricity; as a consequence, its operation can continue even during periods of electric power failure. This is particularly important when the industrial process requires heat to be removed from the hot fluid at all times included times of power outage.

Optimizing the whole system can be achieved by selecting a coolant with suitable characteristics from a cost, heat transfer area, and performance point of view. For example, if only a small heat transfer area is available, then the system will operate under different conditions, for example, smaller or larger tubes with a different suitable coolant. Preferably, an organic fluid, or mixture of organic fluids is used as the coolant. Ammonia, or a mixture of ammonia and water, can be used as the coolant. Thus, investment, operation, and maintenance costs will be reduced by following the teachings of the present invention.

In summary, the present invention advantageously utilizes the comparatively low temperature difference between the temperature of a hot fluid and the temperature of available, usually ambient, air temperature provide a simple, low cost, and comparatively efficient method of and means for cooling a hot fluid.

When the present invention is utilized in a distillation plant, the system will be designed primarily to operate at temperatures common in the last stages of distillation, for example, in the 70°–100° C. range because the storage of fuel in temperatures in excess of 80° C. is not desirable.

While in FIGS. 1 and 3, one fan is shown to be associated with an organic turbine set, several fans can be associated with a single turbine using suitable apparatus, for example, couplings, etc., for achieving the preferred direct connection between the turbine and fans. If preferred, several fans, each with its own turbine can receive the coolant vapor form a single heat exchanger for cooling the coolant condenser.

The advantages and improved results furnished by the method and apparatus of the present invention are apparent from the foregoing description of the preferred embodiment of the invention. Various changes and modifications may be made without departing from the spirit and scope of the invention as described in the appended claims.

I claim:

1. Apparatus for cooling a hot fluid comprising:
   a) a heat exchanger containing an organic fluid and responsive to said hot fluid for cooling the hot fluid and producing vaporized organic fluid;
   b) an organic vapor turbine having an output shaft connected to a fan, and responsive to said vaporized organic fluid for driving the fan which blows ambient air, and for producing expanded organic vapor which exits the turbine;
   c) a condenser for receiving said expanded organic vapor, and responsive to air blown by the fan for condensing said expanded organic vapor into organic fluid condensate; and
   d) means for returning organic fluid condensate to said heat exchanger.

2. Apparatus according to claim 1, wherein said means for returning the condensate to the condenser includes mounting the condenser at a height above the heat exchanger such that gravity assists in returning the condensate from the condenser to the heat exchanger.

3. Apparatus according to claim 1, wherein said means for returning includes a pump.

4. Apparatus according to claim 1, wherein said fan is directly connected to said output shaft.

5. Apparatus for cooling a hot fluid comprising:
   a) a heat exchanger adapted to receive said hot fluid and liquid coolant for cooling the hot fluid and vaporizing the liquid coolant;
   b) a turbine having an output shaft connected to a fan, and responsive to vaporized coolant for driving the fan to blow air, and producing vaporized coolant which exits the turbine;
   c) a condenser for receiving vaporized coolant that exits the turbine, and responsive to air blown by the fan for condensing the vaporized coolant received in the condenser into coolant condensate;
   d) means for returning the coolant condensate to said heat exchanger; and
   e) wherein the fan is provided with a rotation responsive air brake control for controlling the amount of air blown by the fan in response to its rotation.

6. Apparatus according to claim 5, wherein said fan has blades, and said air brake control is in the form of a centrifugally operated flap on one or more blades of the fan.

7. Apparatus for cooling a hot fluid in combination with a Rankine cycle power plant comprising:
   a) a heat exchanger adapted to receive said hot fluid and liquid coolant for cooling the hot fluid and vaporizing the liquid coolant;
   b) a turbine having an output shaft connected to a fan, and responsive to vaporized coolant for driving the fan to blow air, and producing vaporized coolant which exits the turbine;
   c) a condenser for receiving Vaporized coolant that exits the turbine, and responsive to air blown by the fan for condensing the vaporized coolant received in the condenser into coolant condensate;
   d) means for returning the coolant condensate to said heat exchanger; and
   e) a boiler for vaporizing a primary working fluid, a primary turbine for expanding the vaporized working fluid and driving the generator that produces electricity and for producing vaporized primary working fluid which exits the turbine wherein the working fluid that exits the turbine constitutes the hot fluid cooled in said heat exchanger which produces primary working fluid condensate; and
   f) means for returning the condensate to the boiler.

8. Apparatus according to claim 7, wherein said liquid coolant is an organic fluid.

9. Apparatus according to claim 7, wherein said primary working fluid is water, and the water side of said heat exchanger is at greater than atmospheric pressure.

10. A method for cooling a hot fluid comprising:
    a) cooling said hot fluid in a vaporizer containing organic fluid to produce vaporized organic fluid;
    b) expanding said vaporized organic fluid in a turbine driving a shaft and producing heat depleted, expanded organic vapor;
    c) passing said heat depleted, expanded vapor through condenser tubes;
    d) blowing ambient air over said condenser tubes using a fan directly coupled to said shaft for condensing said heat depleted, expanded vapor and producing organic fluid condensate; and
    e) returning said condensate to said vaporizer.

11. A Rankine cycle power plant of the type having a boiler for vaporizing primary working fluid, a primary turbine for expanding the vaporized primary working fluid to drive a generator that produces electricity and for producing heat depleted primary working fluid, a primary condenser for condensing the heat depleted primary working fluid and producing primary condensate, and means for returning the primary condensate to the boiler, said primary condenser comprising:
    a) a vaporizer for receiving said heat depleted primary working fluid and vaporizing liquid secondary working fluid;
    b) a secondary turbine responsive to said vaporized secondary working fluid for expanding the same to drive a load and producing heat depleted secondary working fluid;
    c) a cooling fan that constitutes the load on the secondary turbine;
    d) a secondary condenser positioned in operative relationship to said cooling fan for condensing said heat depleted secondary working fluid and producing secondary condensate; and
    e) means for returning the secondary condensate to the vaporizer.

12. A Rankine cycle power plant according to claim 11 wherein means for returning the secondary condensate to the vaporizer includes means mounting the secondary condenser at a height above the vaporizer such that gravity assists in returning the secondary condensate to the vaporizer.

13. A power plant according to claim 11 wherein the primary working fluid is water, the secondary working fluid is an organic fluid.

14. A Rankine cycle power plant according to claim 13 wherein the organic fluid is pentane.

15. A Rankine cycle power plant according to claim 13 wherein said means for returning the secondary condensate to the vaporizer includes mounting the secondary condenser at a height above the vaporizer such that gravity assists in returning the secondary condensate to the vaporizer.

* * * * *